(12) United States Patent
McCaffrey et al.

(10) Patent No.: US 10,753,849 B2
(45) Date of Patent: Aug. 25, 2020

(54) SUSPENDED PARTICLE CHARACTERIZATION SYSTEM

(71) Applicant: Malvern Panalytical Limited, Malvern (GB)

(72) Inventors: John McCaffrey, Columbia, MD (US); Kevin Dahl, Alexandria, VA (US); Peter Bennett, Columbia, MD (US); Vishal Patil, Columbia, MD (US); E. Neil Lewis, Olney, MD (US)

(73) Assignee: Malvern Panalytical Limited, Malvern, Worcestershire (GB)

( * ) Notice: Subject to any disclaimer, the term of this patent is extended or adjusted under 35 U.S.C. 154(b) by 275 days.

(21) Appl. No.: 15/523,394

(22) PCT Filed: Oct. 13, 2015

(86) PCT No.: PCT/GB2015/053010
§ 371 (c)(1),
(2) Date: Apr. 30, 2017

(87) PCT Pub. No.: WO2016/066992
PCT Pub. Date: May 6, 2016

(65) Prior Publication Data
US 2017/0241894 A1    Aug. 24, 2017

Related U.S. Application Data

(60) Provisional application No. 62/072,223, filed on Oct. 29, 2014.

(51) Int. Cl.
*G01N 15/14* (2006.01)
*B01L 3/00* (2006.01)
*G01N 21/65* (2006.01)

(52) U.S. Cl.
CPC .......... *G01N 15/1456* (2013.01); *B01L 3/508* (2013.01); *G01N 21/65* (2013.01);
(Continued)

(58) Field of Classification Search
CPC ............... G01N 15/1456; G01N 21/65; G01N 2021/651; B01L 3/508
See application file for complete search history.

(56) References Cited

U.S. PATENT DOCUMENTS 6,970,239 B2    11/2005    Chan et al.
7,016,034 B2    3/2006    Holz et al.
(Continued)

FOREIGN PATENT DOCUMENTS

EP    1947441    7/2008
EP    2927689    10/2015
WO    2008069355    6/2008

OTHER PUBLICATIONS

International Search Report, Application PCTGB2015053010, dated Jan. 13, 2016.
(Continued)

*Primary Examiner* — Dominic J Bologna
(74) *Attorney, Agent, or Firm* — Kristofer E. Elbing (57) ABSTRACT

An apparatus (10) for characterizing particles, comprising: a microscope objective with an optical axis and a depth of field; a holder cell (22) configured to position the particles in a generally planar volume below the microscope objective, the planar volume being substantially normal to the optical axis and having a depth that is less than or equal to the depth of field, wherein a portion of the cell holder (22) for positioning in the optical axis of the microscope objective is substantially free of significant spectral features in a Raman spectral range; an x-y stage (20) to move the microscope objective relative to the holder cell (22) in x and
(Continued)

y directions to align particles with the optical axis of the microscope objective while the particles are held by the holder cell (22), a detector (18) for acquiring an image of a particle through the microscope objective, a laser operable to illuminate a particle held by the holder cell (22), a Raman spectrometer (16) arranged to obtain a spectrum including the Raman spectral range from the illuminated particle, and characterizing logic operative to characterize the particle based on image processing operations performed on the acquired image and based on the Raman spectrum. The holder cell (22) comprises a first plate (34) and a second plate (36) that are separated by a predetermined distance defining the planar volume depth.

25 Claims, 9 Drawing Sheets

(52) U.S. Cl.
CPC ............... *B01L 2200/0668* (2013.01); *B01L 2300/0681* (2013.01); *B01L 2300/0819* (2013.01); *B01L 2300/0822* (2013.01); *B01L 2300/0829* (2013.01); *B01L 2300/0851* (2013.01); *B01L 2300/0877* (2013.01); *B01L 2400/049* (2013.01); *B01L 2400/0457* (2013.01); *G01N 2021/651* (2013.01)

(56) References Cited

U.S. PATENT DOCUMENTS

| | | | |
|---|---|---|---|
| 8,279,434 | B2 | 10/2012 | Mertsching et al. |
| 9,042,014 | B1 | 5/2015 | Sethna et al. |
| 2007/0190661 | A1 | 8/2007 | Gudermann |
| 2010/0193398 | A1 | 8/2010 | Marsh |
| 2010/0315628 | A1* | 12/2010 | Mertsching ........ G01N 15/1463 356/301 |
| 2014/0333723 | A1* | 11/2014 | Dowaki ................ G01N 21/65 348/46 |

OTHER PUBLICATIONS

Written Opinion of the International Search Authority, Application PCTGB2015053010, dated Jan. 13, 2016.

\* cited by examiner

SUSPENDED PARTICLE CHARACTERIZATION SYSTEM

FIELD OF THE INVENTION

This invention relates to methods and apparatus for detecting properties of suspended particles.

BACKGROUND OF THE INVENTION

Automated particle characterization systems are well known instruments that allow researchers to characterize properties of individual members of a collection of distributed particles. They generally employ an automated positioning stage to position a microscope and/or spectrometric probe relative to individual particles that are distributed on a substrate. The system then acquires images and/or spectra of the particles and derives properties such as their shape, size, and chemical makeup.

These systems have been typically used to acquire images of airborne particles that have settled onto a microscope slide. They have also been used to acquire images of suspended particles in a liquid sample sitting on a microscope slide or by filtering them out of the liquid and then characterizing them on the surface of the filter. One application of this type is to characterize particulate contaminants in liquid pharmaceutical preparation so that their source can be understood. Because of the potential safety issues involved, this type of characterization should be highly precise and accurate.

SUMMARY OF THE INVENTION

Several aspects of this invention are presented in this specification and its claims. Systems according to the invention can substantially improve the characterization of particles by improving the acquisition and processing of images and spectra. By providing a substantially rigid, optically flat sampling plane with a low Raman signature, systems according to the invention can allow for precise and accurate screening of suspended particulate samples such as potentially contaminated pharmaceutical preparations. And providing a uniform hole pattern where samples are filtered can help to ensure the precision and accuracy of results. These represent a significant advance over prior art approaches in which differences and changes in particle height and/or position, non-uniform filtering, and/or spectral interference can give rise to significant uncertainty of measurements. This level of uncertainty can be particularly problematic in some types of applications in which it is important to be able to make conclusions about all of the particles in a sample, such as when looking for contaminants in pharmaceutical preparations. If particles are missed, mischaracterized, or confused with other particles, this can fundamentally call the overall measurement into question.

According to an aspect of the invention, there is provided an apparatus for characterizing particles, comprising: a microscope objective with an optical axis and a depth of field; a holder cell configured to position the particles in a generally planar volume below the microscope objective, the planar volume being substantially normal to the optical axis and having a depth that is less than or equal to the depth of field, wherein a portion of the cell holder for positioning in the optical axis of the microscope objective is substantially free of significant spectral features in a Raman spectral range; an x-y stage to move the microscope objective relative to the holder cell in x and y directions to align particles with the optical axis of the microscope objective while the particles are held by the holder cell, a detector for acquiring an image of a particle through the microscope objective, a laser operable to illuminate a particle held by the holder cell, a Raman spectrometer 23 arranged to obtain a spectrum including the Raman spectral range from the illuminated particle, and characterizing 20 logic operative to characterize the particle based on image processing operations performed on the acquired image and based on the Raman spectrum.

The term "substantially free of significant spectral features in the Raman spectral range" may mean that the material produces a Raman spectrum with intensity similar to or less than that of fused silica over the range 450-2000 $cm^{-1}$.

The holder cell may comprise a first plate and a second plate that are separated by the planar volume depth.

The holder cell may comprise a biasing mechanism for biasing the first plate and second plate together.

The biasing mechanism may comprise a magnetic biasing mechanism.

The holder cell may comprises a filter, the filter having a surface that deviates from flat by an amount less than or equal to the depth of field.

The filter may comprise: a silicon wafer, a silica wafer, or a fused silica wafer.

The filter may comprise a gold coated material.

The filter is may be less than: 1 mm, 0.5 mm, or 0.25 mm thick.

The filter may comprise fluid passages that are 5 microns in diameter, ±1 micron.

The filter may comprise at least 50 fluid passages.

The filter may comprise fluid passages with a diameter less than or equal to the amount that the filter deviates from flat.

The maximum amount the filter surface deviates from flat may be 5 microns.

The filter may comprise a metal foil and a jig for holding the metal foil.

The Raman spectral range may be about 50-3800 $cm^{-1}$.

The Raman spectral range may be about 450-2000 $cm^{-1}$.

The planar volume depth may be in the range of 10-50 microns.

According to another aspect, there is provided a method of characterizing a collection of particles suspended in a fluid, comprising: providing a holder cell that positions the collection of particles in an at least generally planar volume below a microscope objective having an optical axis normal to the plane of the generally planar volume and having a depth of field along its optical axis that is at least about as deep as a predetermined amount by which the particles held by the holder deviate from flat, wherein a portion of the cell holder in the optical axis of the microscope objective is substantially free of significant spectral features in a Raman spectral range, moving the microscope objective relative to the filter in x and y directions to align at least some of the individual particles with the optical axis of the microscope objective while they are held by the holder cell, acquiring images of at least some of the particles through the microscope objective while they are held by the holder cell, exciting predetermined ones of the particles with a magnified laser having a depth of focus that is at least about as deep as the predetermined amount by which the particles held by the holder cell deviate from flat, acquiring Raman spectra of a least some of the excited particles while they are held by the holder, and characterizing the particles based on image processing operations performed on the acquired images and based on the Raman spectra.

The step of providing may provide a portion of the cell holder that made of fused silica.

The step of providing may provide a portion of the cell holder that made of a gold-plated material.

The step of providing may provide the holder cell as a wet cell having a first plate and a second plate that are separated by a predetermined amount to define the generally planar volume, and may further include the step of introducing the collection of particles in the fluid into the cell.

The method may further include the step of biasing the plates together with a biasing mechanism.

The method may further include the step of biasing the plates together with a magnetic biasing mechanism.

The method may further include the step of biasing the plates together at a distance that is on the order of 25 microns.

The step of providing provides the holder cell as a filter cell that includes a filter insert into which a plurality of passages that are smaller than a size of at least some of the suspended particles in the collection have been formed, wherein the filter insert is sufficiently rigid that it deviates from flat by a only predetermined maximum amount and thereby defines the generally planar volume. The method may further include the step of passing the fluid through passages in the filter insert to thereby hold at least some of the particles in the collection of particles on the filter insert.

The step of passing the fluid through a filter may include passing the fluid through a laser-drilled wafer. The step of passing the fluid through a filter may include passing the fluid through a laser-drilled silicon wafer. The step of passing the fluid through a filter may include passing the fluid through a laser-drilled fused silica wafer. The step of passing the fluid through a filter includes passing the fluid through a silicon wafer. The step of passing the fluid through a filter may pass the fluid through a fused silica wafer.

The step of passing the fluid through a filter may include passing the fluid through a wafer that is less than 1 mm thick; or less than 0.5 mm thick; or less than about 250 microns thick.

The step of passing the fluid through a filter may include passing the fluid through a wafer in which the passages are about 5 microns in diameter+/−1 micron.

The step of passing the fluid through a filter may pass the fluid through a wafer that has at least about 50 of the passages.

The maximum amount by which the planar substrate deviates from flat may be of the same order of magnitude as a diameter of the passages.

The method may include a step of focusing the objective that includes finding a highest level of contrast for the holes to set a z-axis reference.

The maximum amount by which the planar substrate deviates from flat may be at most on the order of five microns.

The filter cell may include a metal foil held by a jig.

The Raman spectral range may be about 450-2000 $cm^{-1}$; or about 50-3800 $cm^{-1}$.

According to another aspect, there is provided an apparatus for characterizing a collection of particles suspended in a fluid, comprising: a holder cell that positions the collection of particles in an at least generally planar volume below a microscope objective having an optical axis normal to the plane of the generally planar volume and having a depth of field along its optical axis that is at least about as deep as a predetermined amount by which the particles held by the holder deviate from flat, wherein a portion of the cell holder in the optical axis of the microscope objective is substantially free of significant spectral features in a Raman spectral range; an x-y stage to move the microscope objective relative to the filter in x and y directions to align at least some of the individual particles with the optical axis of the microscope objective while they are held by the holder cell, a detector for acquiring images of at least some of the particles through the microscope objective while they are held by the holder cell, a magnified laser having a depth of focus that is at least about as deep as the predetermined amount by which the particles held by the holder cell deviate from flat, a Raman spectrometer 23 responsive to a least some of the excited particles while they are held by the holder, and characterizing logic operative to characterize the particles based on image processing operations performed on the acquired images and based on the Raman spectra.

The portion of the cell holder may include at least one of: fused silica, silicon, or a gold-plated material.

The holder cell may be a wet cell having a first plate and a second plate that are separated by a predetermined amount to define the generally planar volume.

The apparatus may further include a biasing mechanism positioned to bias the plates together. The apparatus may further include a magnetic biasing mechanism positioned to bias the plates together.

The plates may nominally be separated by a distance that is on the order of 25 microns.

The holder cell is a filter cell that includes a filter insert into which a plurality of passages that are smaller than a size of at least some of the suspended particles in the collection have been formed, wherein the filter insert is sufficiently rigid that it deviates from flat by a only predetermined maximum amount and thereby defines the generally planar volume.

The planar substrate may be substantially free of significant spectral features in the Raman spectral range of about 450-2000 cm-1

The planar substrate may be substantially free of significant spectral features in the Raman spectral range of about 50-3800 cm-1.

According to another aspect, there is provided an apparatus for characterizing a collection of particles suspended in a fluid, comprising: holding means that positions the collection of particles in an at least generally planar volume below a microscope objective having an optical axis normal to the plane of the generally planar volume and having a depth of field along its optical axis that is at least about as deep as a predetermined amount by which the particles held by the holding means deviate from flat, wherein a portion of the holding means in the optical axis of the microscope objective is substantially free of significant spectral features in a Raman spectral range, means for moving the microscope objective relative to the filter in x and y directions to align at least some of the individual particles with the optical axis of the microscope objective while they are held by the holding means, means for acquiring images of at least some of the particles through the microscope objective while they are held by the holder cell, magnified means for exciting predetermined ones of the particles having a depth of focus that is at least about as deep as the predetermined amount by which the particles held by the holding means deviate from flat, means for acquiring Raman spectra of a least some of the excited particles while they are held by the holding means, and means for characterizing the particles based on image processing operations performed on the acquired images and based on the Raman spectra.

DETAILED DESCRIPTION OF AN ILLUSTRATIVE EMBODIMENT

Figure 1:
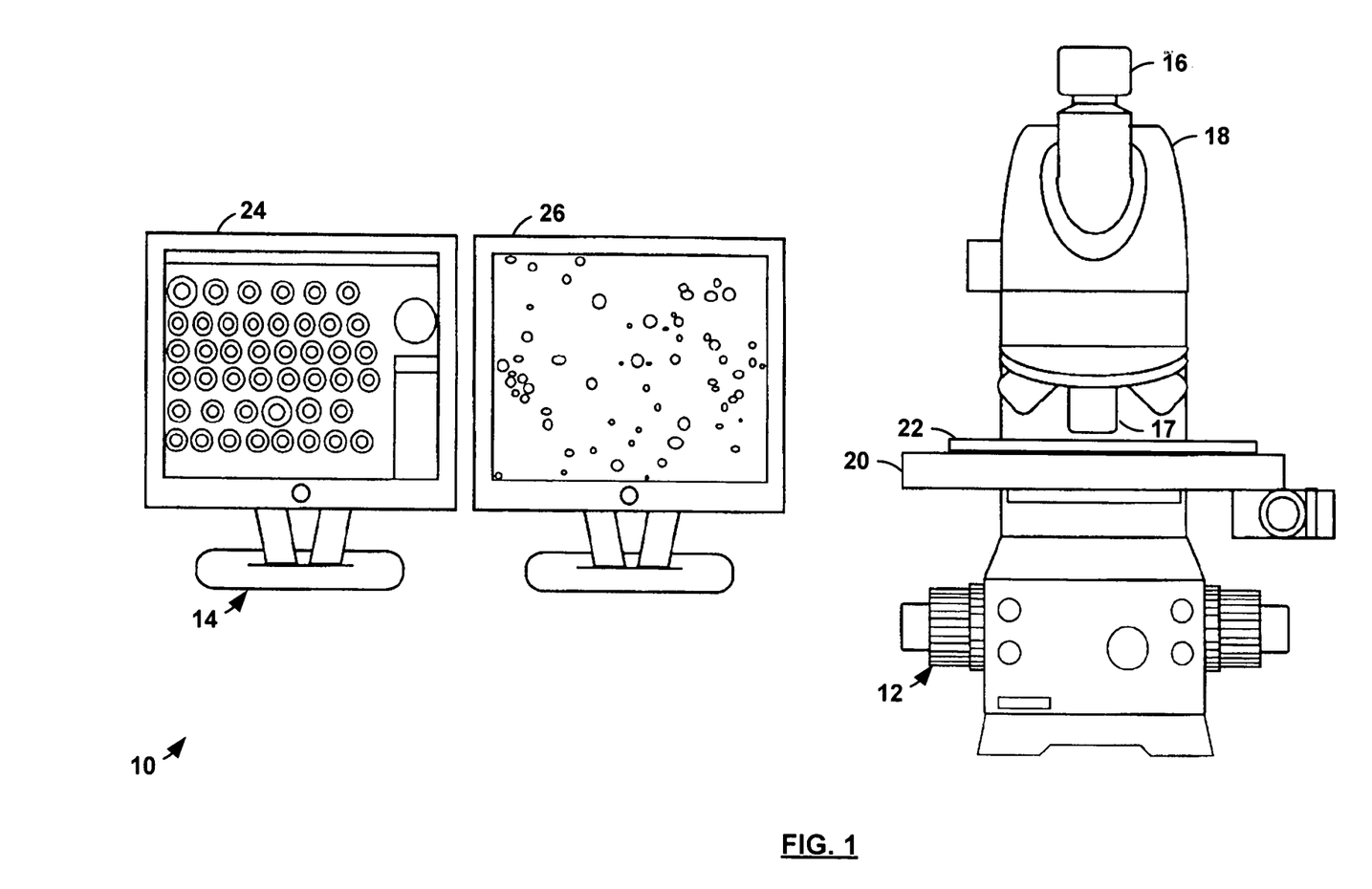
FIG. 1 is a diagram of a particle characterization system according to the invention.

Referring to FIG. 1, an automated particle characterization system 10 according to the invention is based on a microscope 12 and control and analysis system 14. In one embodiment, the system is based on the Morphologi G3-ID particle characterization system available from Malvern Instruments Ltd of Malvern UK. It includes a microscope equipped with a Raman detector 16 and a CCD camera 18 that are positioned to view a sample in a sample holder 22 on a computer-controlled, precision X-Y stage 20. This system allows a user to take visible-wavelength-pictures of particles within the sample area and show them in a live-video view 26. The individual particles can be selected and viewed by positioning the X-Y stage under user or computer control. The system can also characterize and classify the shape of particles and show them as a set of thumbnail images in a result view 24.

Figure 2:
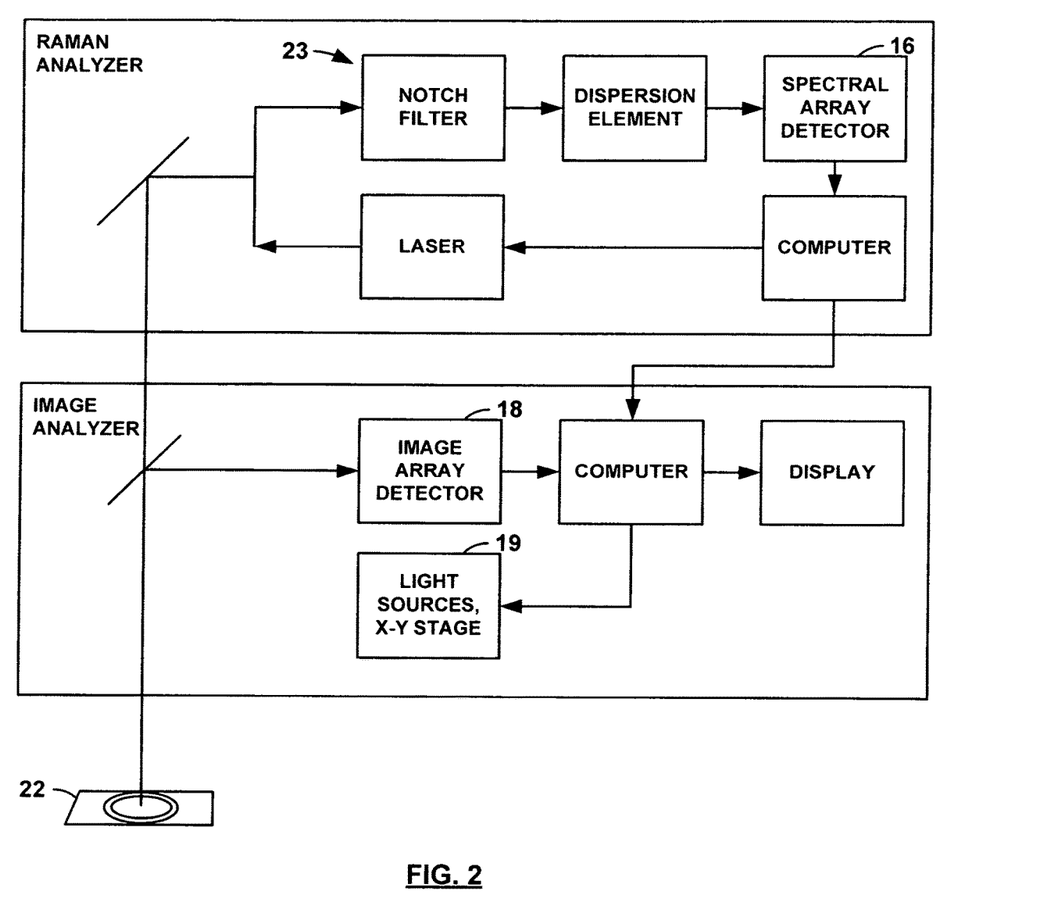
FIG. 2 is a functional block diagram of the system of FIG. 1.

As shown in FIG. 2, the illustrative automated particle characterization system 10 illuminates a particulate sample in the sample holder 22 using one or more light sources 17 and acquires still and/or video images of particles in the sample using the image array detector 18 (e.g. CCD camera). The Raman analyzer operates by exciting a portion of the sample, such as a selected particle, using monochromatic radiation (e.g. from a laser) which may be conveyed through the microscope's optics. The excited sample material inelastically scatters this radiation at wavelengths that are shifted with respect to the laser in what is known as the Raman effect. The spectrum of the Raman-shifted radiation is characteristic of the probed material. An optical fiber may be used to convey it through a notch (holographic) filter to isolate it from the laser radiation. A dispersion element (e.g. grating) then separates the isolated radiation into its spectral components. A spectral detector (e.g. ganged detector rows of a CCD detector) may be used to detect the intensities of the spectral components, and thereby obtain the characteristic Raman spectrum of the probed sample portion.

A further light source may be provided (not shown in FIG. 2) for performing imaging in a transmission mode, in which light is received by the image array detector after passing through the sample holder 22. Furthermore, the Raman analyzer may be alternatively or additionally configured to illuminate the sample from the opposite side to the image array detector. The Raman analyzer may further be alternatively or additionally configured to detect Raman scattered light exiting the sample on this opposite side.

The Morphologi G3-ID software allows the user to select an area of a dispersed particulate sample within the field of view of the microscope. The software can then automatically locate and characterize particles within that area and display the located particles as a set of thumbnail images in the result view screen. The software can also characterize each of the displayed particles based on a number of different morphological attributes, such as length, width, perimeter length, area, circularity, center of mass position, and/or aspect ratio, to name a few. Characteristics of the particles can then be aggregated in statistical views or they can be used to sort the particle thumbnails.

The user can manually select one or more of the acquired particles in the result screen and instruct the G3-ID System to acquire their Raman spectra. The user can highlight a contiguous group of particles, for example, and initiate an acquisition of a spectrum for each of them. This will cause the computer to use the X-Y stage to probe the selected particles by successively positioning each of them below the Raman interface and acquiring a Raman spectrum at one or more points on that particle. The G3-ID System can then add the acquired Raman spectrum to the characteristics of each probed particle, and the user will then be able to sort, search, or statistically aggregate the particles based on their particular spectral characteristics. The user can also use the microscope and/or the Raman probe to explore the sample manually at any point in the process.

A Standard Operating Procedure (SOP) interface can be used to preset the system's operation for a particular application. This interface allows the user to preset settings for sample details, pre-measurement, measurement control, sample carrier, sample dispersion unit, illumination, optics selection, analysis, filters, classification, post measurement, and reporting. It is contemplated, for example, that a user might automate a procedure that begins by selecting particles of a certain size range in acquired visible image data, and then goes on to identify the composition of the selected particles with the Raman analyzer.

Figure 3:
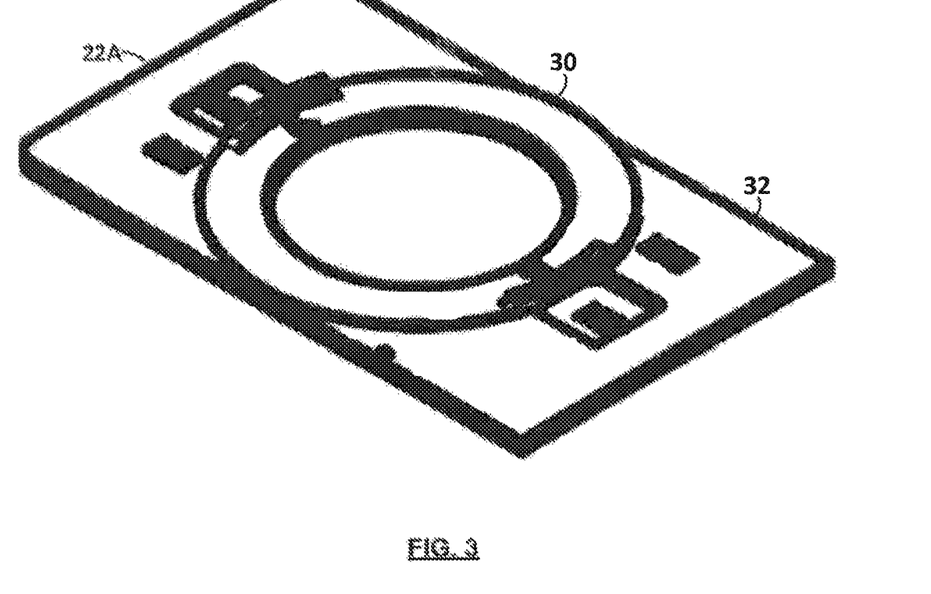
FIG. 3 is a perspective diagram of a wet-cell sample holder for the system of FIG. 1.
Figure 4:
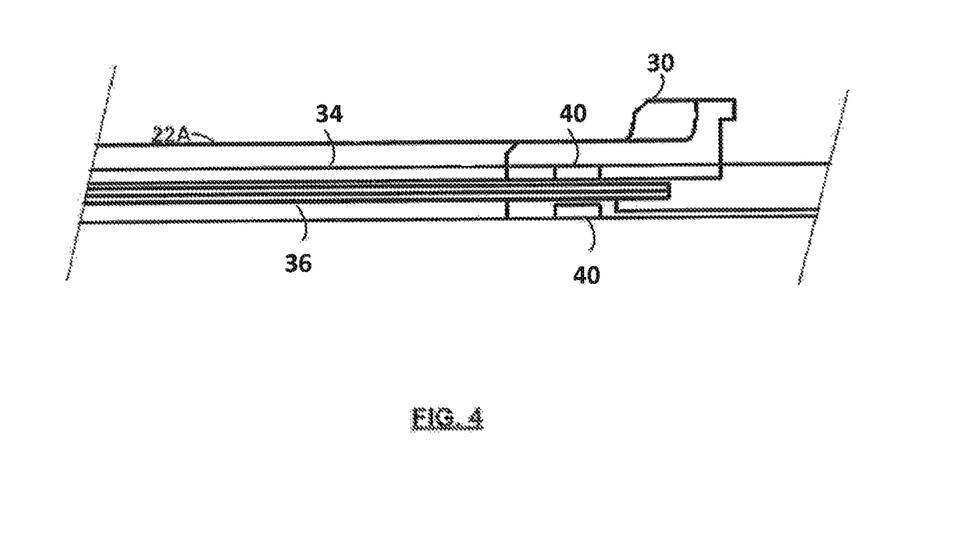
FIG. 4 is a cross-sectional diagram of the wet-cell sample holder of FIG. 3.

Referring to FIGS. 3-4, the sample holder 22 can be in the form of a wet cell 22A. This cell includes a body 32 that includes a recess to receive a retaining ring 30. The retaining ring supports an upper plate 34 above a lower plate 36 to define a narrow gap. In this embodiment, the ring is about three inches in diameter and the plates are both made of fused silica to define a 25 micron gap, resulting in a cell volume of 100 microliters, although other materials and/or dimensions may be appropriate depending on the target application. Fused silica is both sufficiently transparent to enable transmission mode and reflection mode imaging, and is suitable for performing Raman analysis through, without contributing sufficient spectral response to mask signals of interest from a sample. Although fused silica is a useful material, alternatives with similar properties may also be used.

The plates are held together by a series of magnet pairs positioned around the cell (six in this case). Each pair includes a magnet on the body and a corresponding magnet of opposite polarity on the retaining ring. These apply an even pressure to cause the ring to bear down on the body and thereby cause the sample to spread out evenly within the cell. While magnets are preferred, other suitable mechanisms can be used to provide this function. Preferably, the cell holds the particles within a depth of field of the microscope as well as within a depth of focus of the Raman laser.

Keeping the sample in a thin layer that is preferably within the depth of field of the microscope can improve the images acquired, help to avoid missing particles, and help to prevent the need to focus the microscope each time an image of a particle is acquired. This can be a significant improvement over prior art attempts to simply acquire images in droplets on microscope slides.

Figure 5:
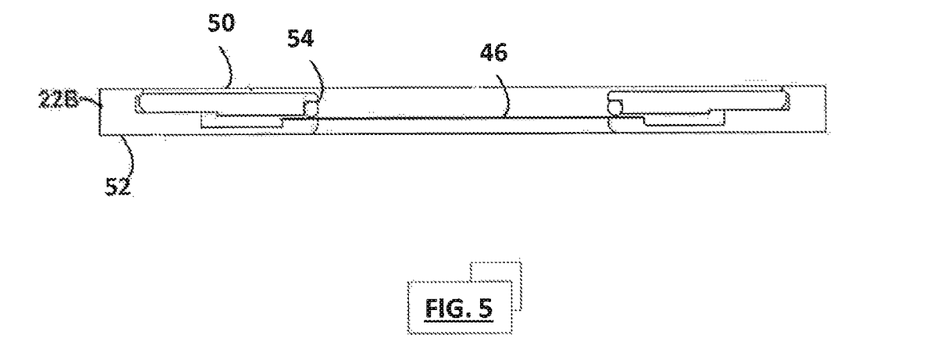
FIG. 5 is a perspective diagram of a filter-cell sample holder for the system of FIG. 1.
Figure 6:
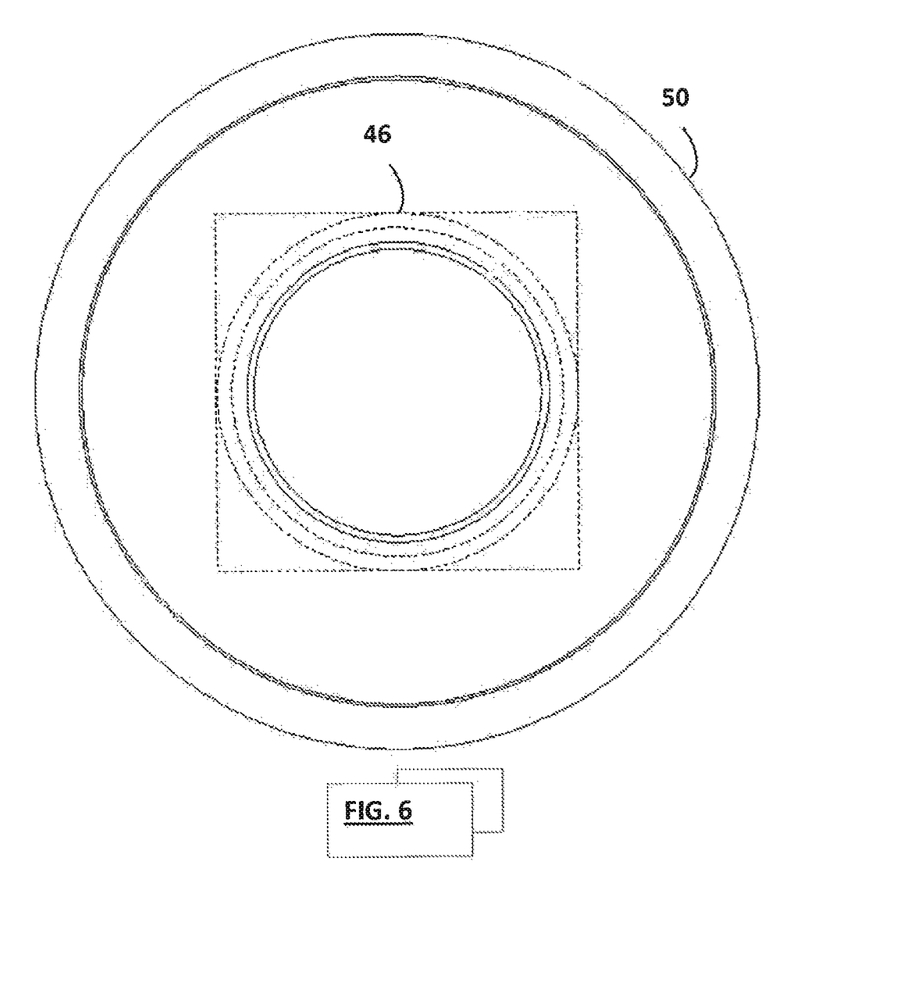
FIG. 6 is a cross-sectional diagram of the filter-cell sample holder of FIG. 5.

Referring to FIGS. 5-6, the sample holder 22 can also be in the form of a filter cell 22B. The filter cell is used to characterize particles that have been filtered out of a liquid sample. This embodiment of the filter cell includes a retaining ring 50 that holds a filter insert 46 onto a cell body 52 using a gasket 54. The liquid sample is preferably first filtered through the filter insert while it is held in place with the retaining ring and body, and then transferred onto the instrument.

The filter insert 46 is preferably disposable, preferably has a low Raman signature, and is preferably sufficiently optically flat to keep the particles it supports within the field of view of the microscope. To this end it can be made of a material that is both rigid and does not exhibit significant spectral features in the Raman wavelength region bands and can be readily provided with a significant number of through holes.

Figure 7:
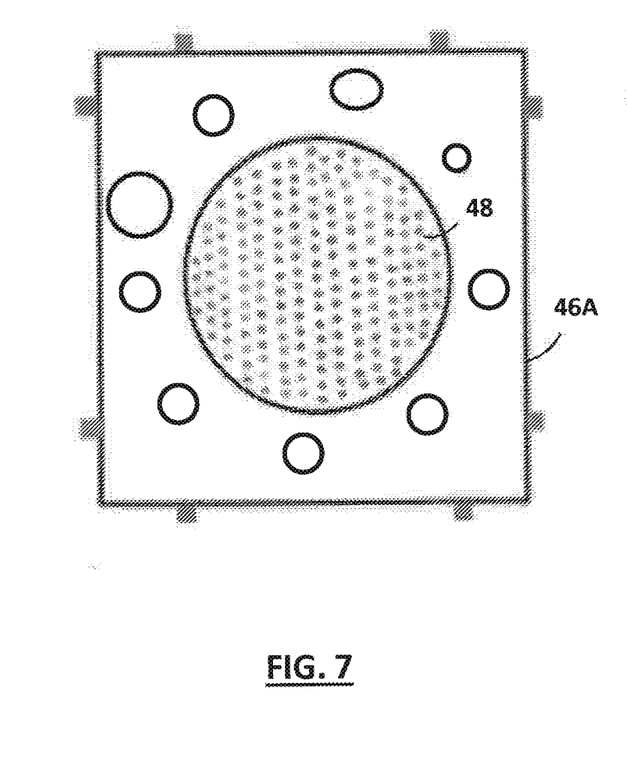
FIG. 7 is a plan view diagram of a filter insert for the filter-cell sample holder of FIG. 5.
Figure 8:
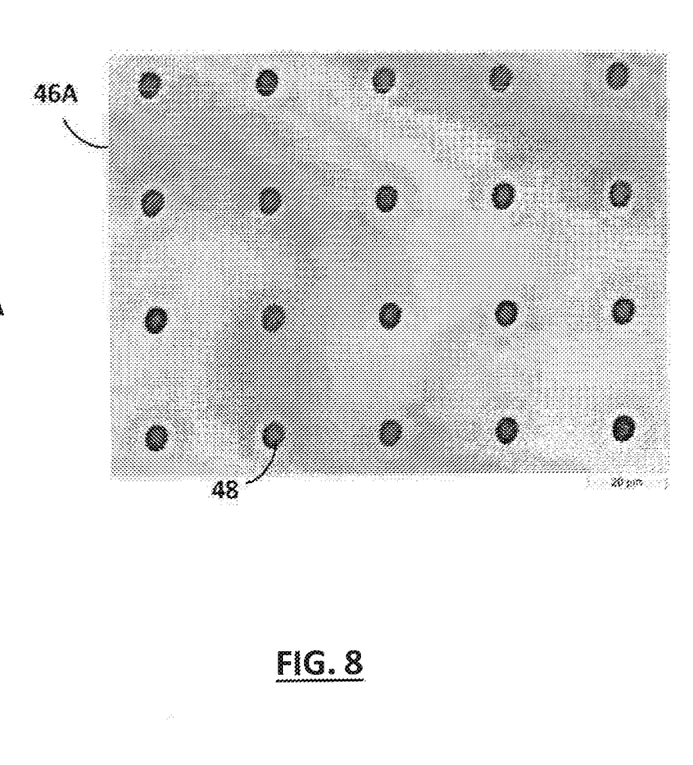
FIG. 8 is a magnified image of a portion of the filter insert of FIG. 7 taken with bottom light at a 50× magnification.
Figure 9:
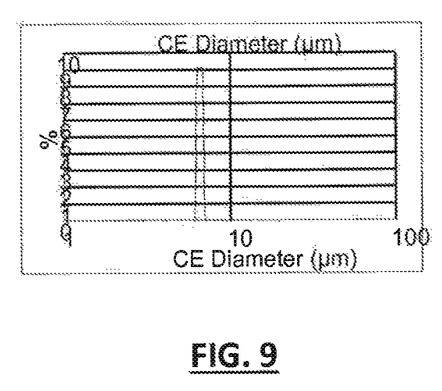
FIG. 9 is a plot of hole diameter distribution for holes in the magnified view of FIG. 7.
Figure 10:
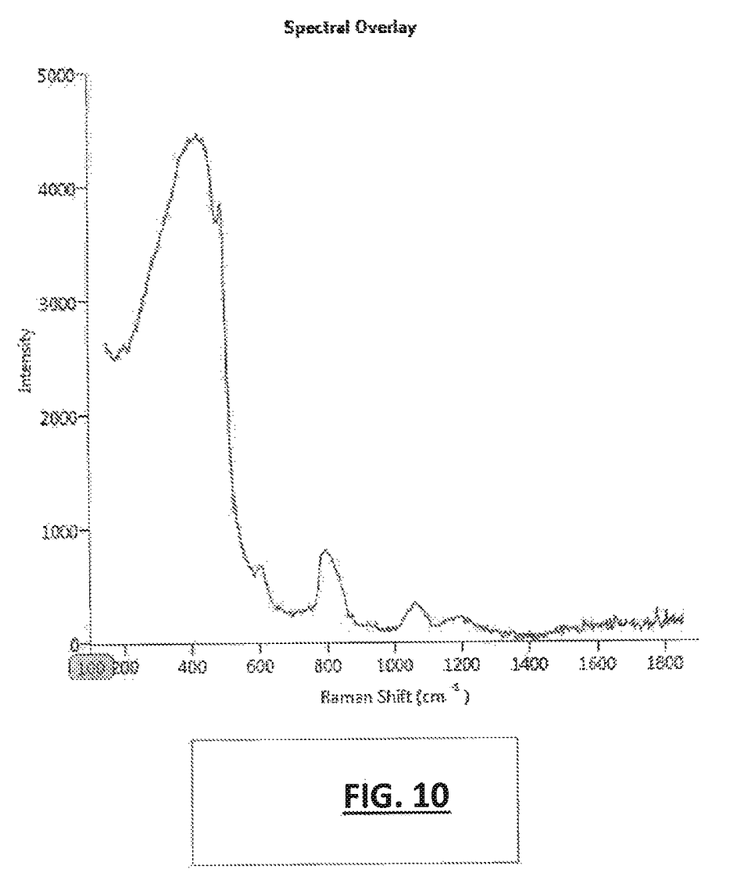
FIG. 10 is a plot of a Raman spectrum of the filter insert of FIG. 7.

Referring also to FIGS. 7-8, a filter insert 46A has been made of a 150 micron thick fused silica substrate with 10,000 holes 48 that have been drilled through it, although other numbers of holes from 1,000 or 2,000 to 100,000 are also contemplated. The drilling can be performed by chemically assisted laser etching, which can provide small, well-defined, and uniformly spaced holes that have a somewhat hour-glass shaped profile, as shown in FIG. 8. These holes have been characterized using the instrument as having a range of diameters that are narrowly distributed around 6.57 microns in diameter at their narrowest point, as shown in FIG. 9, although hole sizes of between around 1 and 20 microns are contemplated. The Raman spectrum of the filter has also been measured and includes a relatively uncluttered spectral signature in the Raman wavelength region, as show in FIG. 10. This filter is also sufficiently optically flat that it keeps particles within the field of view of the microscope. And because the holes are uniformly spaced, there are no clusters of overlapping holes that could allow some of the target particles to pass and thereby avoid detection. Silica also has the advantage that it allows both transmitted (back illumination) and reflected (top illumination) light microscopy.

While fused silica having a thickness of 150 microns is one preferred substrate, other thicknesses and other materials can also be used. Some examples include tantalum or nickel-cobalt (NiCo) sheets coated with gold. Holes can be made in the sheets in a variety of different ways or the filter can made from a relatively thin slice of a capillary plate, such as a fused silica plate. Electrochemically etched gold-plated NiCo sheets are particularly promising because they exhibit good hole uniformity and spacing, and can be made relatively inexpensively. The fused silica filter insert 46A of FIGS. 5-8 can also be coated with gold to improve its Raman characteristics.

Figure 11:
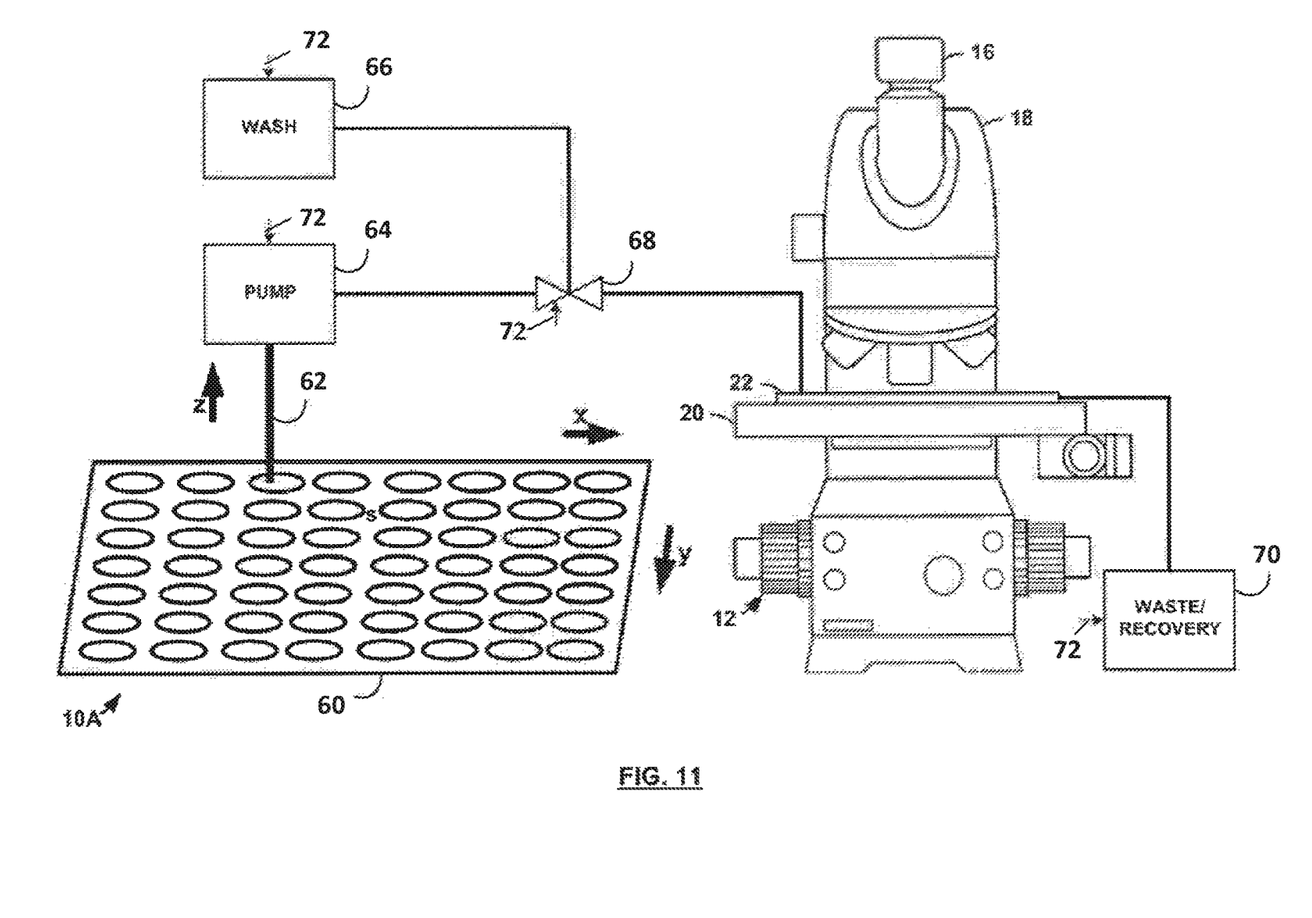
FIG. 11 is a diagram of an automated high-throughput particle characterization system according to the invention.

Referring to FIG. 11, an automated high-throughput version of the system 10A can also be used to perform repeated sampling tasks. This system includes a sample well plate equipped with an off-the-shelf X-Y-Z stage, although other methods of holding samples can also be provided. Systems may also be configured to draw a series of samples from a single container, such as to find all contaminant particles in a larger volume of liquid.

The system 10A includes a pump 62 that collects a sample and then introduces it into the sample holder 22, although other sample introduction arrangements, such as a simple gravity feed could also be employed. A wash vessel 66 and two-way valve 68 can also be provided to flush the sample holder between samples.

A waste/recovery subsystem 70 is provided to receive the sample and wash. This subsystem can simply direct all of the wash and sample in the output stream from the holder 22 to a waste container, or it may also be configured to recover the samples. In the case of filter-based systems, it can include a pump, such as a vacuum pump, to draw the sample through the filter. The various parts of the system can be driven by the control and analysis system 14 via control lines 72 to allow for unattended operation.

Figure 12:
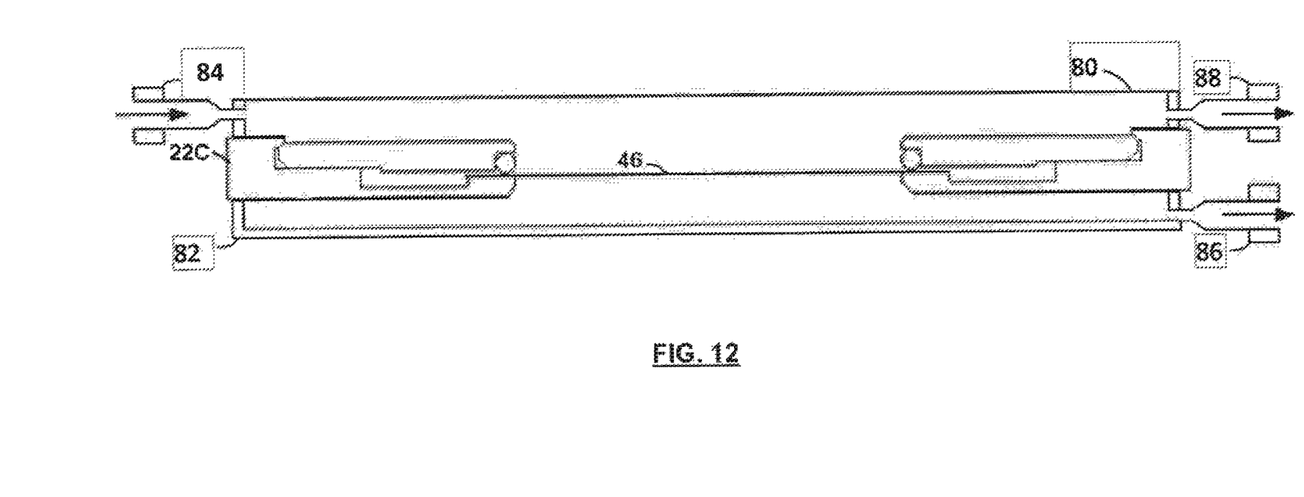
FIG. 12 is a cross-sectional diagram of a filter-cell sample holder for the automated high-throughput particle characterization system of FIG. 11.

Referring to FIG. 12, the sample holder 22 can also be in the form of a filter cell 22C. This embodiment of the filter cell includes an open bathtub-like upper reservoir 80 to hold sample liquid received from the sampler through an inlet connector 84. It also includes a drain pan 82 with a fused silica or otherwise Raman-transparent bottom to collect fluid that has passed through the filter insert 46 and direct it to an outlet connector 86 and on to the waste/recovery subsystem 70. A second outlet connector 88 is also provided on the upper reservoir to allow the filter's upper surface to be washed.

Figure 13:
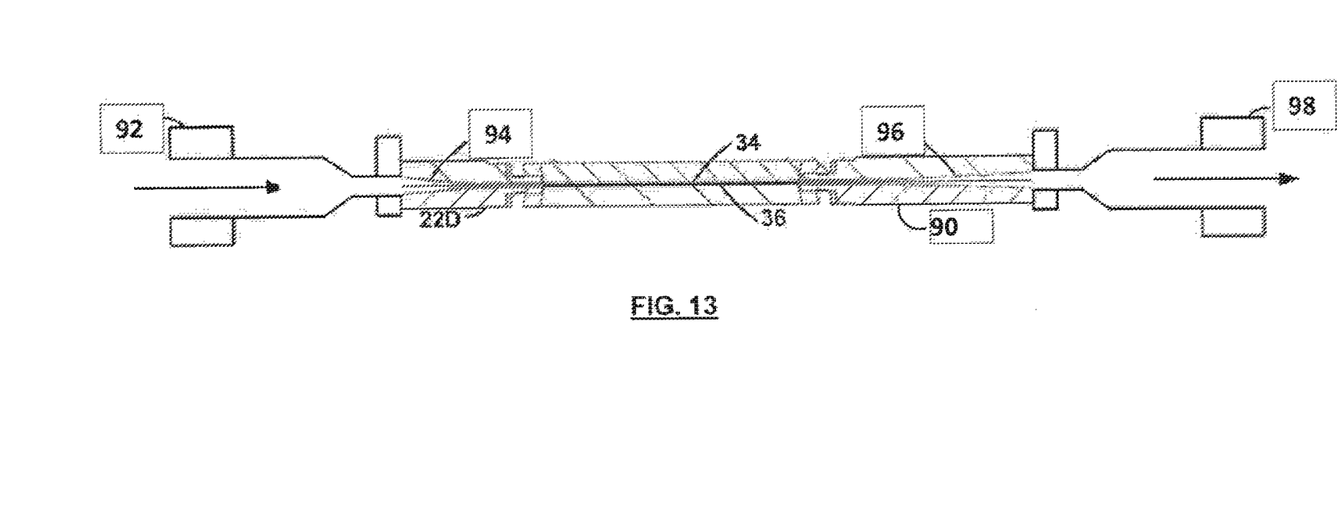
FIG. 13 is a cross-sectional diagram of a wet-cell sample holder for the automated high-throughput particle characterization system of FIG. 11.

Referring to FIG. 13, the sample holder 22 can be in the form of a wet flow cell 22D. This embodiment of the cell includes a body 90 that defines a tapered inlet 94 that hydraulically connects an input port 92 to a narrow gap sampling volume defined by an upper plate 34 above a lower plate 36. Preferably this cell should have a carefully designed, streamlined flow to allow successive sample-wash cycles to be performed efficiently. The design of cells of this general type for particle detection is described in U.S. Provisional Application No. 61/982,810, filed Apr. 22, 2014, which is herein incorporated by reference.

Referring to FIGS. 11-14, the operation (100) of the automated high-throughput system 10A can begin with the selection of a sample, where samples are stored in different vessels (step 102). The system then sets the two-way valve 72 to connect the pump to the sample holder, and actuates the pump 64 to transfer a predetermined quantity of the sample to the sample holder 22. In the case of a filter flow cell 22C, the waste/recovery subsystem 70 may also actuate a pump to draw the sample through the filter.

Figure 14:
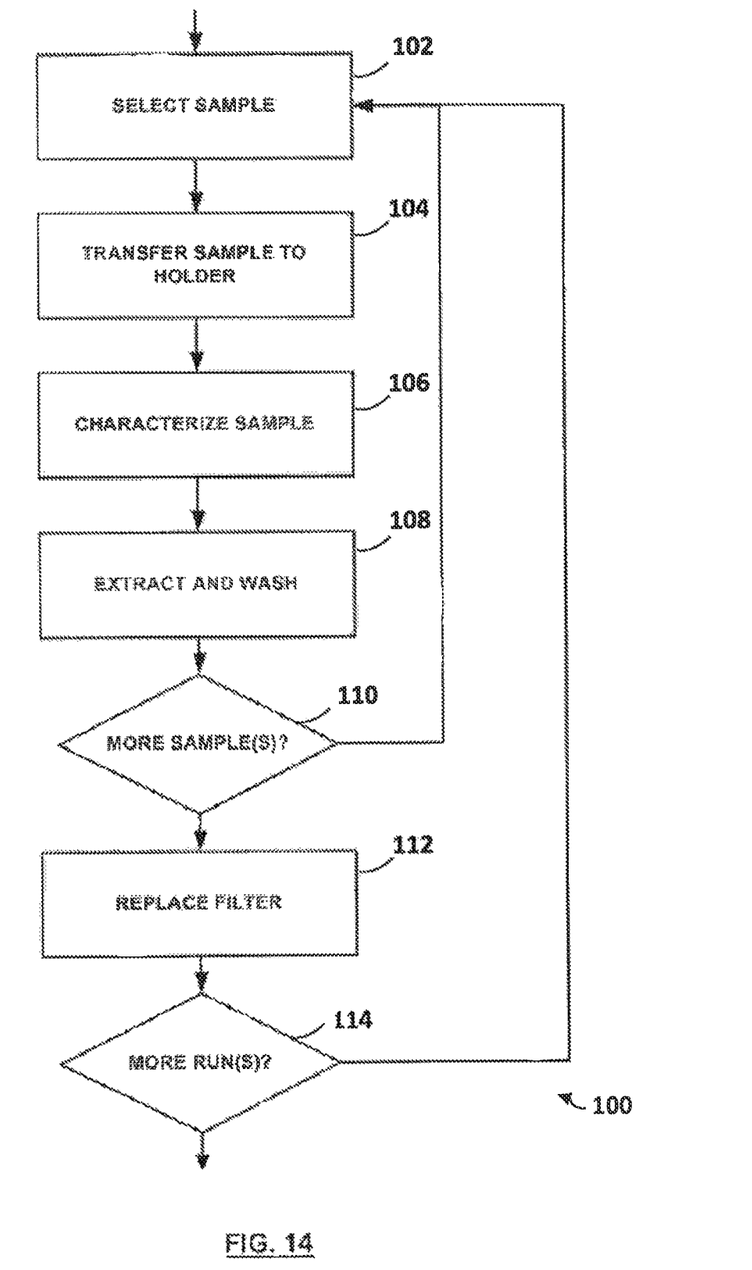
FIG. 14 is a flowchart illustrating a method of operation for the system of FIG. 11.

Once the sample is in place, the system can acquire images and/or spectra from the particles. It may also take further steps to characterize the particles at run time, or leave some or all of these steps for later (see step 106). The system can then extract and wash the sample (step 108). If the sample is in a wet flow cell and is being recovered, the waste/recovery subsystem 70 might first draw as much of the sample as is practical through the cell into a recovery vessel and then drive wash fluid through to clean the cell. It may also drive wash fluid through to flush the sample out in a single operation.

After cleaning the filter, the system is ready for another sample (step 110), and another sample-wash cycle can begin. The system may also be equipped to replace the filter after one or more runs (step 112) before beginning another run (step 114).

The system described above has been implemented in connection with a particular off-the-shelf instrument, but it could also be implemented using other instruments. It could also be custom built based on special-purpose software programs running on general-purpose computer platforms, and/or based special-purpose hardware. And while the system can be broken into the series of modules and steps shown for illustration purposes, one of ordinary skill in the art would recognize that it is also possible to combine them and/or split them differently to achieve a different breakdown, and that the functions of such modules and steps can be arbitrarily distributed and intermingled within different entities, such as routines, files, and/or machines. Moreover, different providers can develop and/or operate different parts of the system.

The present invention has now been described in connection with a number of specific embodiments thereof. However, numerous modifications which are contemplated as falling within the scope of the present invention should now be apparent to those skilled in the art. For example, the shape and operation of the sample holders could be set up differently. Therefore, it is intended that the scope of the present invention be limited only by the scope of the claims appended hereto. In addition, the order of presentation of the claims should not be construed to limit the scope of any particular term in the claims.

The invention claimed is:

1. An apparatus for characterizing particles, comprising:
a microscope objective with an optical axis and a depth of field;
a holder configured to position the particles in a generally planar area below the microscope objective, the planar area being substantially normal to the optical axis and wherein a lower portion of the holder for positioning in the optical axis of the microscope objective opposite the microscope objective with respect to the sample is substantially free of significant spectral features in a Raman spectral range;
an x-y stage to move the microscope objective relative to the holder in x and y directions to align particles with the optical axis of the microscope objective while the particles are held by the holder cell,
a source that is operative to illuminate the holder from a side of the holder that is opposite the microscope objective,
a detector for acquiring an image of a particle through the microscope objective,
a laser operable to illuminate a particle held by the holder cell,
a Raman spectrometer arranged to obtain a spectrum including the Raman spectral range from the particle illuminated by the laser, and
characterizing logic operative to characterize the particle based on image processing operations performed on the acquired image and based on the Raman spectrum.

2. The apparatus of claim 1, wherein the holder comprises a pair of plates and a biasing mechanism for biasing the first plate and second plate together.

3. The apparatus of claim 2, wherein the biasing mechanism comprises a magnetic biasing mechanism.

4. The apparatus of claim 2, wherein the portion of the holder for positioning in the optical axis includes a portion of the first plate and/or the second plate.

5. The apparatus of claim 2, wherein the first and second plate are both made from fused silica.

6. The apparatus of claim 1, wherein the portion of the holder for positioning in the optical axis comprises a Raman-neutral filter, the filter having a surface that deviates from flat by an amount less than or equal to the depth of field.

7. The apparatus of claim 6, wherein the filter comprises: a silicon wafer, a silica wafer, or a fused silica wafer.

8. The apparatus of claim 6, wherein the filter comprises a gold coated material.

9. The apparatus of claim 6, wherein the filter is less than 1 mm thick.

10. The apparatus of claim 6, wherein the filter comprises fluid passages that are 5 microns in diameter, ±1 micron.

11. The apparatus of claim 6, wherein the filter comprises at least 50 fluid passages.

12. The apparatus of claim 6, wherein the filter comprises fluid passages with a diameter less than or equal to the amount that the filter deviates from flat.

13. The apparatus of claim 6, wherein the maximum amount the filter surface deviates from flat is 5 microns.

14. The apparatus of claim 6, wherein the filter comprises a metal foil and a jig for holding the metal foil.

15. The apparatus of claim 6 wherein the filter is laser-drilled.

16. The apparatus of claim 6 wherein the filter includes a wafer in which the passages are 20 microns or less in diameter.

17. The apparatus of claim 6 further including a vacuum pump to draw the particles toward the filter.

18. The apparatus of claim 6, wherein the filter is less than 0.5 mm thick.

19. The apparatus of claim 6, wherein the filter is less than 0.25 mm thick.

20. The apparatus of claim 1, wherein the Raman spectral range is about 50-3800 cm-1.

21. The apparatus of claim 1, wherein the Raman spectral range is about 450-2000 cm-1.

22. A method of characterizing a collection of particles suspended in a fluid, comprising:
providing a holder that positions the collection of particles in an at least generally planar area below a microscope objective having an optical axis normal to the plane of the generally planar area, wherein a lower portion of the holder in the optical axis of the microscope objective opposite the microscope objective with respect to the sample is substantially free of significant spectral features in a Raman spectral range,
moving the microscope objective relative to the holder in x and y directions to align at least some of the individual particles with the optical axis of the microscope objective while they are held by the holder cell,
illuminating the holder from a side of the holder that is opposite the microscope objective,
acquiring images of at least some of the particles through the microscope objective while they are held by the holder cell,
exciting predetermined ones of the particles with a magnified laser,
acquiring Raman spectra of a least some of the excited particles while they are held by the holder, and characterizing the particles based on image processing operations performed on the acquired images and based on the Raman spectra.

23. The method of claim 22 wherein the step of providing a holder provides the holder as a filter and further including a step of drawing the particles toward the filter using a vacuum pump.

24. The method of claim 22 wherein the step of exciting is performed through the microscope objective.

25. The method of claim 22 wherein the step of exciting is performed from a side of the holder that is opposite the microscope objective.

* * * * *